United States Patent [19]

Sijbers et al.

[11] Patent Number: 4,680,789
[45] Date of Patent: Jul. 14, 1987

[54] AUDIO TRANSMISSION CIRCUIT COMPRISING A TRANSMIT AMPLIFIER IN THE FORM OF A LINE VOLTAGE STABILIZER

[75] Inventors: Peter J. M. Sijbers; Henricus J. M. Otten, both of Eindhoven; Petrie J. Van Der Plaats, Hilversum, all of Netherlands

[73] Assignee: U. S. Philips Corporation, New York, N.Y.

[21] Appl. No.: 705,766

[22] Filed: Feb. 26, 1985

[51] Int. Cl.$^4$ ............................................. H04M 1/60
[52] U.S. Cl. ................................... 379/395; 379/387
[58] Field of Search ............... 330/293, 294; 381/111, 381/112, 113, 114, 115, 120, 121; 179/81 B, 81 A, 81 R, 16 F; 379/395, 387

[56] References Cited

U.S. PATENT DOCUMENTS

| | | | |
|---|---|---|---|
| 3,748,399 | 7/1973 | Matsuda et al. | 379/395 |
| 3,867,576 | 2/1975 | Simonsen | 379/395 X |
| 3,909,548 | 9/1975 | Jacobson | 379/389 |
| 4,233,474 | 11/1980 | Hishinuma et al. | 379/395 |
| 4,358,644 | 11/1982 | Hubler | 379/403 |
| 4,394,542 | 7/1983 | Hara et al. | 379/394 |
| 4,459,553 | 7/1984 | Diller | 330/85 |
| 4,562,309 | 12/1985 | Le Croff et al. | 379/361 |

OTHER PUBLICATIONS

"Integrated Linear Basic Circuits", van Kessel et al, Philips Technical Review, vol. 32, No. 1, 1971, pp. 1-12.

Primary Examiner—Gene Z. Rubinson
Assistant Examiner—R. Vaas
Attorney, Agent, or Firm—Thomas A. Briody; Jack Oisher; William J. Streeter

[57] ABSTRACT

A transmit amplifier which also stabilizes the line direct voltage of the audio transmission circuit of a telephone set with respect to a reference voltage, the amplifier gain being adjustable to a high value by means of a resistor which does not affect the further properties of the audio transmission circuit. Variation of the line direct voltage by the offset current of the microphone pre-amplifier preceding the transmit amplifier, and by temperature fluctuations of the reference voltage, is greatly reduced by increasing the reference voltage and adding a temperature-dependent current source to a voltage divider which is comprised in the amplifier.

3 Claims, 2 Drawing Figures

AUDIO TRANSMISSION CIRCUIT COMPRISING A TRANSMIT AMPLIFIER IN THE FORM OF A LINE VOLTAGE STABILIZER

BACKGROUND OF THE INVENTION

1. Field of the Invention

The invention relates to an audio transmission circuit for a telephone set which is fed with line direct voltage via the subscriber line, comprising a high-output impedance microphone pre-amplifier and a transmit amplifier which is in the form of a line voltage stabiliser and includes an input stage constituted by a fed-back operational amplifier and includes an output stage which is formed by an output transistor and an associated emitter resistor, which output stage is arranged in parallel with the subscriber line, a signal input of this operational amplifier being connected to the output of the microphone pre-amplifier, and the transmit amplifier further comprising a reference voltage source for producing a reference voltage for line voltage stabilisation.

2. Description of the Related Art

Such an audio transmission circuit is disclosed in the article "A programmable Speech Circuit Suitable for Telephone Transducers", IEEE Journal of Solid-State Circuits, Vol. Sc-17, No. 6, December 1982, pages 1149–1157.

In operation, a telephone set connected to a subscriber line of a public telephone network receives from the telephone exchange via this subscriber line a line voltage which comprises the line d.c. voltage and the received a.c. signal voltage. During transmission, the line d.c. voltage is modulated with the signal to be transmitted by the telephone set.

The administrations prescribe a maximum direct voltage across the set, which maximum direct voltage further depends on the line current. A typical value for the maximum line direct voltage is, for example, 5.7 V at a 10 mA line current. In the telephone set the line direct voltage is set by a voltage stabiliser which may form part of the transmit amplifier.

The audio transmission circuit described in said IEEE article comprises a transmit amplifier which not only stabilises the line d.c. voltage but is also included in a Wheatstone-bridge for producing the anti-sidetone effect and with which in addition the desired line terminating impedance can be actively realized. The properties of the audio transmission circuit as regards the above-mentioned functions are determined by passive components, which also determine the gain of transmit amplifier. Consequently, it is not easy to increase this gain in a simple way without adversely affecting the other properties of the audio transmission circuit.

SUMMARY OF THE INVENTION

The invention has for its object to provide a novel concept of the audio transmission circuit as set forth in the opening paragraph, in which the gain of the transmit amplifier is determined by a component which does not affect the further properties of the audio transmission circuit.

So as to accomplish this object, the audio transmission circuit according to the invention, is characterized in that:

a voltage divider comprising a first resistor and a parallel arrangement of a second resistor and a capacitor is arranged in parallel with the subscriber line, the second resistor comprising the emitter resistor of an output transistor the signal input of the operational amplifier is connected to the emitter of the output transistor via a feedback circuit which comprises the reference voltage source and a feedback resistor, and the other input of the operational amplifier is connected to the junction of the first and second resistors.

Because of the configuration of components which determine the properties of the transmit amplifier and of the line voltage stabilizer opted for it is achieved that the gain of the transmit amplifier only depends on the value of the feedback resistor. When the audio transmission circuit is realized in integrated form, it is now only necessary to provide one single resistor, namely the feedback resistor, as an external component outside the integrated circuit to realize a variable gain.

Since in the transmission circuit according to the invention the line terminating impedance is not actively realized with the aid of the transmit amplifier, the availability of a feed point from which all the other circuits of the audio transmission circuit can be fed is obtained as an additional advantage. Namely, it is now possible to form the line terminating impedance separately by the series arrangement of a line terminating resistor and a supply capacitor for blocking the direct current. The junction between the line terminating resistor and the supply capacitor can now be used as a direct current feed point, as substantially no a.c. voltage is present any more across the supply capacitor.

Microphone pre-amplifiers in audio transmission circuits often produce an output direct current without an input signal being present, commonly denoted as the offset current. Such offset currents are the result of, for example, spread in the properties of the components forming the circuit, or of temperature fluctuations. A microphone pre-amplifier in the integrated form having a carefully constructed differential input stage can still produce an offset current of the order of magnitude of 1 $\mu$A.

In the audio transmission circuit according to the invention, in which the microphone pre-amplifier is connected to a highly resistive input of the transmit amplifier, the offset current produces a direct voltage—the offset voltage—across the feedback resistor. This offset voltage in the feedback circuit constitutes to all appearances a deviation from the reference voltage for the line voltage stabilisation, so that a deviation of the line direct voltage is produced.

When a forward-biased diode is used as a voltage reference circuit the reference voltage is, for example, 0.6 V. A possible value of the feedback resistor is 180 k$\Omega$, so that for an offset current of 1 $\mu$A an offset voltage of 0.18 V is produced. So in the above numerical example a spread of approximately 30% may occur in the line direct voltage at an in all other respects constant line direct current of a small value.

The administrations prescribe that the line direct voltage shall not exceed a predetermined value, for example 5.7 V. When a conventional diode bridge is used across which there is a voltage of 1.5 V, the voltage across the audio transmission circuit must not exceed 4.2 V. As a highest possible line direct voltage is desired for the design of the several components of an audio transmission circuit, it is important to keep the spread in the line direct voltage as small as possible.

An embodiment of the audio transmission circuit in accordance with the invention having a reduced spread of the line direct voltage, is characterized in that the reference voltage source is formed by at least two diodes which are arranged in series in the same sense and are forward biased.

This measure reduces the relative variation in the direct voltage in the feedback circuit because of the offset current of the microphone amplifier by a factor which is equal to the number of diodes in the feedback circuit.

An embodiment of the audio transmission circuit in accordance with the invention, which has the advantage that any temperature fluctuations of the reference voltage source can be compensated for in a simple way, is characterized in that the transmit amplifier comprises a current source producing a load independent current and having a temperature coefficient whose sign is opposite to the sign of the temperature coefficient of the reference voltage source, which current source is arranged in parallel with the capacitor of the voltage divider.

With a suitable dimensioning of the resistance of the voltage divider, a decrease for example of the reference voltage is compensated for by an increase in the voltage drop across the first resistor in response to an increase in current of the current source.

BRIEF DESCRIPTION OF THE DRAWINGS

The invention will now be described in greater detail by way of example with reference to the accompanying Figures, in which corresponding components of the various Figures are given the same reference numerals. Herein.

DESCRIPTION OF THE PREFERRED EMBODIMENTS

Figure 1:
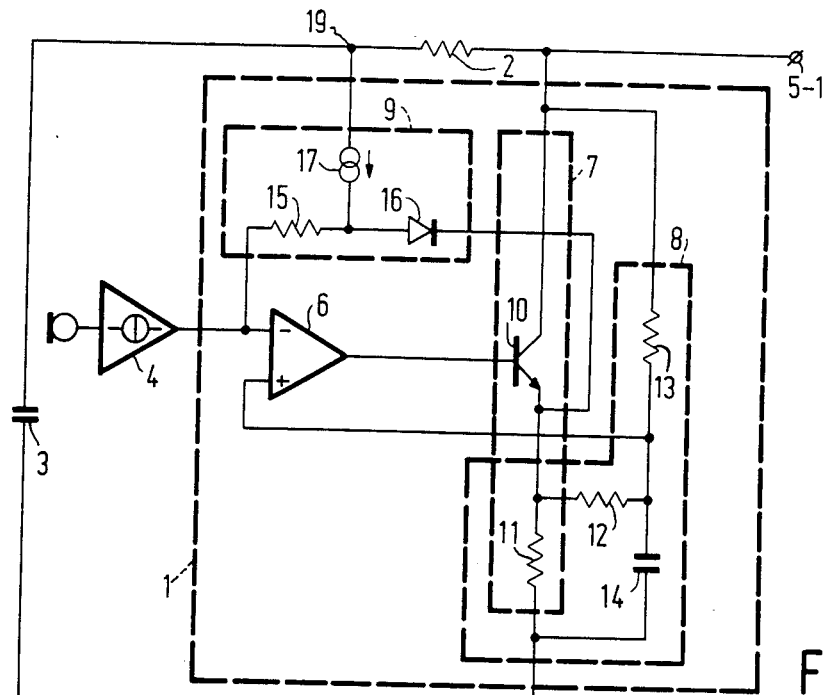
FIG. 1 shows an audio transmission circuit comprising a transmit amplifier in accordance with the invention and FIG. 2 shows an audio transmission circuit, comprising a transmit amplifier in accordance with the invention, having a construction which is particularly suitable for reducing the spread in the line voltage values.

The audio transmission circuit shown in FIG. 1 is formed by a transmit amplifier 1 which also serves as a line voltage stabiliser, a line terminating resistor 2 having a resistance value of, for example, 600 Ω, a supply capacitor 3 having a capacitance of, for example, 10 μF, and a microphone pre-amplifier 4 connected to the signal input of the transmit amplifier. This microphone pre-amplifier has a high input impedance and is therefore symbolically shown as an amplifier having a current source with a load-independent current. Together with the supply capacitor 3 the line terminating resistor 2 forms a series arrangement which is connected to the subscriber line terminals 5-1 and 5-2 via a conventional diode bridge, which is not shown in the Figure. The junction point 19 of line terminating resistor and supply capacitor 3 forms a direct voltage feedpoint having a highly attenuated a.c. voltage component.

Transmit amplifier 1 is formed by an operational amplifier 6, an output stage 7 having a two-terminal output, a voltage divider 8 and a feedback circuit 9. The output stage 7 is connected to the subscriber line terminals 5-1 and 5-2.

Operational amplifier 6 is connected by means of its inverting input to microphone pre-amplifier 4. The output of the operational amplifier 6 is connected to the base of an output transistor 10, whose emitter is connected to an emitter resistor 11 having, for example, a value of 20 Ω. Output transistor 10 and emitter resistor 11 together form the output stage 7.

Voltage divider 8 is formed by a capacitor 14 of, for example, 2 μF and a series arrangement of a resistor 13 of, for example, 110 kΩ, a 20 kΩ resistor 12 and the emitter resistor 11, capacitor 14 being arranged in parallel with the two last-mentioned resistors. The series arrangement of the resistors 11, 12 and 13 is connected to the subscriber line terminals 5-1 and 5-2. The non-inverting input of operational amplifier 6 is connected to the junction of resistor 12 and resistor 13.

Feedback circuit 9 is formed by a feedback resistor 15 of, for example, 180 kΩ, a diode 16, whose anode is connected to resistor 15 and a constant current source 17, which is connected to the junction between feedback resistor 15 and diode 16 and biases the diode 16 in the forward direction. The other side of current source 17 is connected to supply point 19.

An input signal current applied by microphone pre-amplifier 4 to the input of transmit amplifier 1 produces an output signal current through transistor 10. The input signal current flows substantially wholly through feedback resistor 15 because the input of operational amplifier 6 has a high impedance; the output signal current flows substantially wholly through emitter resistor 11 because the latter is of a much smaller value than the series arrangement of resistor 12 and capacitor 14 which are in parallel with said emitter resistor. The current gain of transmitter stage 1 must be understood to mean the ratio of the output signal current to the input signal current.

Because capacitor 14 shows substantially no impedance to signal current, substantially no signal impedance appears at the non-inverting input of operational amplifier 6 and consequently, because of the high gain, neither at the inverting input. The signal voltages across feedback resistor 15 and emitter resistor 11 are consequently equal, so that the current ratio, i.e. the current gain of transmitter stage 1, is equal to the ratio between the resistors 15 and 12. For said numerical examples the current gain is consequently 9000 (79 dB).

The line direct voltage which is set by the transmit amplifier 1 which operates as a voltage stabiliser depends on the values of the different components in the following way. The voltage across capacitor 14, the voltage at the non-inverting input and the voltage at the inverting input of operational amplifier 6 are mutually equal. Since no direct current flows through feedback resistor 15 in the case of a zero value input direct current, the emitter voltage of transistor 10 is one diode forward voltage $V_d$ lower than said voltages. The voltage across resistor 12, whose resistance value is denoted by $R_{12}$ is consequently also equal to the diode voltage $V_d$, whilst the voltage across resistor 13, whose value is denoted by $R_{13}$ is $R_{13}/R_{12}$ times larger.

The line direct voltage is the sum of the voltages across the resistors 13 and 12 and across the emitter resistor 11, whose value is denoted by $R_E$. The direct voltage across resistor 11 is substantially equal to the product of the value of resistor 11 and the line direct current $I_1$, as only a small portion of the line direct current flows through resistor 2. Thus it is found that for the line voltage $V_1$ it holds that:

$$V_1 = I_1 R_E + \left(1 + \frac{R_{13}}{R_{12}}\right) V_d \quad (1)$$

using the afore mentioned numerical examples, this expression results in a line direct voltage of 4.2 V for a 15 mA line direct current and a 0.6 V diode voltage.

The output stage 7 of the transmit amplifier 1, which operates as a voltage stabiliser must have for a.c. voltage signals in the audio frequency range an adequately high impedence to prevent as much as possible the line terminating impedance from being influenced. This indispensable high impedance is obtained because capacitor 14 and resistors 11 and 13 together with operational amplifier 6, seen from terminal 5-1 and 5-2 behave as an inductor. The value of this apparent inductance is equal to the product of the value of resistor 11, the value or resistor 13 and the capacitance of capacitor 14. With the said numerical examples the value of this apparent inductance appeared to be approximately 4.4 H.

The high value of the current gian, 79 dB, of transmit stage 1 is realized by choosing the value of the feedback resistor 15 to be adequately high. As now the whole offset current of, for example, 1 μA of microphone pre-amplifier 4 flows through feedback resistor 15, the high resistance value thereof produces an offset voltage of, for example, 0.18 V across feedback resistor 15, which is undesirable in certain circumstances.

The spread produced by the offset voltage in the line direct voltage to be set by the voltage stabiliser would force the designer to choose a low nominal value of the direct voltage to be set, so as to always satisfy the maximum value requirements of the line direct voltage imposed by the administrations, or to choose a much lower gain of transmit stage 1. A low gain is undesirable as this would greatly limit the fields of application of the audio transmission circuit. When a low nominal value is chosen for the line direct voltage, the value of the line direct voltage may in adverse cases result in a value which is an amount equal to the spread lower than the nominal value chosen by the designer, which value is already low. With said numerical examples it was found that at a maximum line direct voltage of 4.2 V the nominal line direct voltage must be designed to have a value of 3.0 V, it being possible for the line direct current to assume a value of 1.8 V in the case of a disadvantageous value and direction of the offset current. This low value may be objectionable for, for example, feeding further electronic circuits of the audio transmission circuit.

Figure 2:
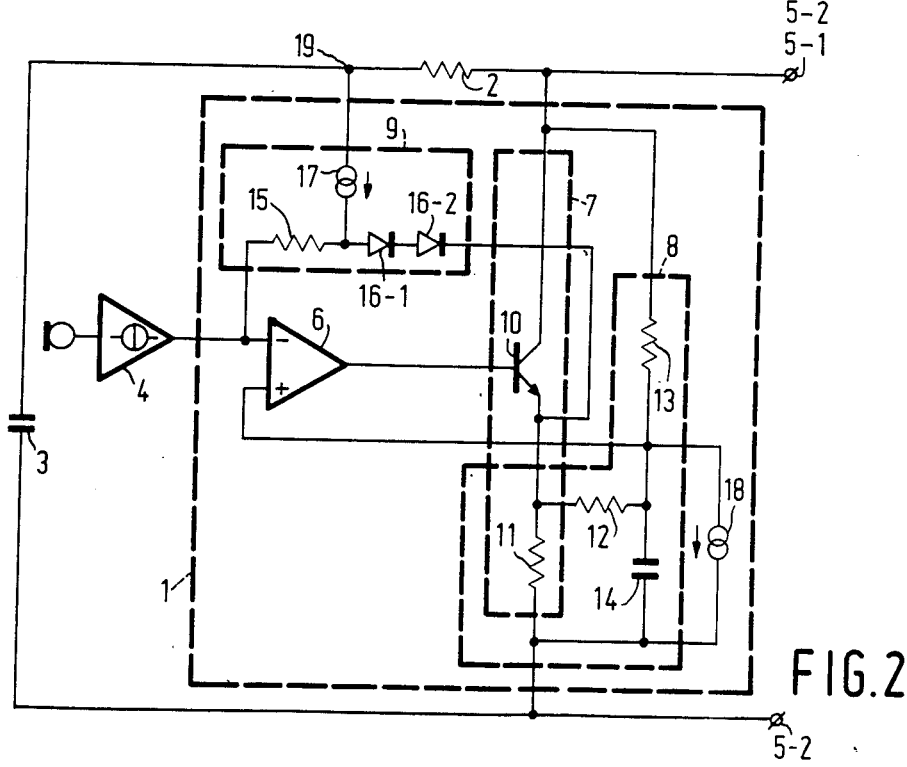

FIG. 2 shows an embodiment of the audio transmission circuit according to the invention in which the above-described problem as regards the spread is solved, and in which also the influence of temperature fluctations on the diode voltage of the reference voltage diode 16 is reduced.

Replacing in FIG. 1 diode 16 by two series-arranged diodes 16-1 and 16-2 and by adding a load independent current source 18 in parallel with capacitor 14 results in the circuit diagram of audio transmission circuit shown in FIG. 2. These alterations make an adaptation of the dimension of transmit amplifier 1 necessary. The resistor 13 now has a value of, for example, 16 kΩ, whilst resistor 12 has a value of, for example, 21.5 kΩ.

The diodes 16-1 and and 16-2 are biased in the forward direction by current source 17. Current source 18 has a temperature coefficient of the current which compensates for the influence of the temperature coefficient of the diode voltage and the line direct voltage. The effect of the presence of current source 18 on the line direct voltage may be expressed by adding an extra term to formula (1) equal to the magnitude of the product of the resistance value $R_{13}$ of resistor 13 and the current $I_O$ through current source 18.

The expression for the line direct voltage $V_1$ now becomes:

$$V_1 = I_1 R_E + 2\left(1 + \frac{R_{13}}{R_{12}}\right) V_d + I_o R_{13} \quad (2)$$

In formula (2) the adapted values of $R_{12}$ and $R_{13}$ must now be substituted. The coefficient of the reference voltage $2V_d$ in the above formula now becomes approximately 1.75.

When the offset voltage across resistor 15 is not changed, the influence of this offset voltage on the spread in the line direct voltage is reduced by a factor of approximately 3.7 because the coefficient of $V_d$ in formula (1) decreased by the same factor. Consequently, the spread in the line d.c. voltage becomes an acceptable value.

A current which does not depend on the load of a current source flows through the current source 18. This current is directly porportional to the temperature with a positive temperature coefficient. Sources of this type are known per se, for example, from the article "Integrated linear basic circuits", Phillips Technical Review, Vol. 32, 1971, No. 1. By a suitable choice of the value of the resistors 12 and 13 it is now accomplished that the effect of the positive temperature coefficient of current source 18 on the line direct voltage just compensates for the effect of the negative temperature coefficient of the diodes 16-1 and 16-2.

What is claimed is:

1. An improved transmit amplifier which stabilizes the subscriber line voltage of a telephone set connected to such line, such telephone set comprising such transmit amplifier and a high-output impedance microphone pre-amplifier, such transmit amplifier being supplied with direct voltage by the subscriber line; such transmit amplifier comprising: an input stage constituted by a feedback operational amplifier having an inverting input and a non-inverting input, the inverting input thereof being connected to the output of the microphone pre-amplifier; an output stage formed by an output transistor having an emitter resistor, such output stage being arranged in parallel with the subscriber line; and a reference voltage source for producing a reference voltage for line voltage stabilization; such improvement being characterized in that such transmit amplifier further comprises:

a voltage divider formed by a first resistor and a parallel arrangement of a second resistor and a capacitor, such voltage divider being in parallel with the subscriber line and the junction of said first and second resistors being connected to the non-inverting input of said operational amplifier, the emitter resistor of said output transistor forming part of said second resistor;

and a feedback circuit connecting the inverting input of said operational amplifier to the emitter of said output transistor, such feedback circuit comprising said reference voltage source and a feedback resistor.

2. An improved transmit amplifier as claimed in claim 1, characterized in that the reference voltage source comprises at least two diodes connected in series in the same sense between said feedback resistor and the emitter of said output transistor.

3. An improved transmit amplifier as claimed in claim 1, wherein said reference voltage source has a temperature coefficient, such transmit amplifier further comprising a current source producing a load-independent current and having a temperature coefficient opposite in sign to the sign of the temperature coefficient of said reference voltage source; such current source being connected in parallel with the capacitor of said voltage divider.

* * * * *